United States Patent
Yoshino et al.

(10) Patent No.: US 11,976,596 B2
(45) Date of Patent: May 7, 2024

(54) FUEL SUPPLY PIPE ASSEMBLY, GAS TURBINE COMBUSTOR, AND GAS TURBINE

(71) Applicant: MITSUBISHI HEAVY INDUSTRIES, LTD., Tokyo (JP)

(72) Inventors: Kota Yoshino, Tokyo (JP); Norihiko Motoyama, Tokyo (JP); Shinya Hashimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/129,238

(22) Filed: Mar. 31, 2023

(65) Prior Publication Data
US 2023/0332545 A1  Oct. 19, 2023

(30) Foreign Application Priority Data
Apr. 14, 2022 (JP) .................................. 2022-066867

(51) Int. Cl.
*F02C 7/00* (2006.01)
*F02C 7/22* (2006.01)
*F23R 3/28* (2006.01)

(52) U.S. Cl.
CPC ................ *F02C 7/222* (2013.01); *F23R 3/28* (2013.01)

(58) Field of Classification Search
None
See application file for complete search history.

(56) References Cited

U.S. PATENT DOCUMENTS

| | | | |
|---|---|---|---|
| 2014/0083111 A1* | 3/2014 | Gregg | F23R 3/50 60/740 |
| 2015/0308349 A1 | 10/2015 | Rohrssen et al. | |
| 2016/0161124 A1* | 6/2016 | Low | F02C 7/22 285/133.11 |
| 2020/0003165 A1* | 1/2020 | Porter | F02M 27/04 |
| 2021/0025496 A1* | 1/2021 | Kwoka | F02C 7/32 |

FOREIGN PATENT DOCUMENTS

| | | |
|---|---|---|
| JP | 2003-206967 | 7/2003 |
| JP | 2015-210075 | 11/2015 |

\* cited by examiner

*Primary Examiner* — Edwin Kang
(74) *Attorney, Agent, or Firm* — Wenderoth, Lind & Ponack, L.L.P.

(57) ABSTRACT

A fuel supply pipe assembly according to at least one embodiment of the present disclosure is a fuel supply pipe assembly for supplying fuel to a fuel nozzle provided on a side portion of a combustion liner of a gas turbine combustor, provided with: a fuel supply pipe for supplying the fuel to the fuel nozzle; a first flange portion capable of coupling with a flange portion of a fuel line for supplying the fuel to the fuel supply pipe; and a second flange portion capable of coupling with a top hat portion of the gas turbine combustor. The first flange portion has a plurality of radially outward protrusions arranged at intervals in the circumferential direction, and a plurality of first bolt holes penetrating the first flange portion in the axial direction. The first bolt holes are formed at the same circumferential positions as the protrusions, respectively.

9 Claims, 7 Drawing Sheets

FUEL SUPPLY PIPE ASSEMBLY, GAS TURBINE COMBUSTOR, AND GAS TURBINE

TECHNICAL FIELD

The present disclosure relates to a fuel supply pipe assembly, a gas turbine combustor, and a gas turbine.

BACKGROUND

A gas turbine combustor is known that can supply fuel to a combustion liner of the gas turbine combustor through a fuel nozzle provided on the side of the combustion liner. In such a gas turbine combustor, a fuel supply pipe for supplying fuel to the fuel nozzle penetrates a mounting ring which secures the gas turbine combustor to a casing (see Patent Document 1, for example).

CITATION LIST

Patent Literature

Patent Document 1: JP201.5-210075A

SUMMARY

For example, if the upstream end of the fuel supply pipe is provided with a flange portion to be coupled with a flange portion of a fuel line for supplying fuel to the fuel supply pipe, the flange portion at the upstream end of the fuel supply pipe needs to be inserted into a through hole of the mounting ring. Therefore, the size of the through hole in the mounting ring must be large enough to allow the flange portion at the upstream end of the fuel supply pipe to be inserted.

From the viewpoint of the flow rate of fuel supplied to the fuel nozzle, it is necessary to increase the diameter of the fuel supply pipe to some extent, but when the diameter of the fuel supply pipe is increased, the diameter of the flange portion at the upstream end of the fuel supply pipe is also increased. However, it is difficult to increase the size of the through hole in the mounting ring since it is restricted by the size of the casing to which the mounting ring is attached, the size of the combustion cylinder, or the like. Therefore, using a standardized flange makes it difficult to increase the diameter of the fuel supply pipe, making it difficult to ensure the flow rate of fuel supplied to the fuel nozzle.

In view of the above, an object of at least one embodiment of the present disclosure is to provide a fuel supply pipe assembly allowing fuel to be supplied at a flow rate required in a fuel nozzle provided on a side portion of a combustion liner of a gas turbine combustor, a gas turbine combustor and a gas turbine provided with this fuel supply pipe assembly.

(1) A fuel supply pipe assembly according to at least one embodiment of the present disclosure is a fuel supply pipe assembly for supplying fuel to a fuel nozzle provided on a side portion of a combustion liner of a gas turbine combustor, provided with: a fuel supply pipe for supplying the fuel to the fuel nozzle; a first flange portion capable of coupling with a flange portion of a fuel line for supplying the fuel to the fuel supply pipe; and a second flange portion capable of coupling with a top hat portion of the gas turbine combustor. The first flange portion has a plurality of protrusions arranged at intervals in the circumferential direction and protruding radially outward, and a plurality of first bolt holes penetrating the first flange portion in the axial direction. The plurality of first bolt holes are formed at the same circumferential positions as the protrusions, respectively.

(2) A gas turbine combustor according to at least one embodiment of the present disclosure is provided with: the fuel supply pipe assembly having the above configuration (1); the combustion liner; the fuel nozzle; and the top hat portion. The top hat portion includes a top hat body having a through hole allowing the first flange portion to pass through in the axial direction. The top hat body has a plurality of top hat protrusions arranged at intervals in the circumferential direction and protruding radially inward toward the center of the through hole, and a plurality of third bolt holes penetrating the top hat body in the axial direction. The plurality of third bolt holes are formed at the same circumferential positions as the top hat protrusions, respectively.

(3) A gas turbine according to at least one embodiment of the present disclosure is provided with: a compressor; the gas turbine combustor having the above configuration (2); and a turbine configured to be driven by combustion gas from the gas turbine combustor.

According to at least one embodiment of the present disclosure, it is possible to supply fuel at a flow rate required in the fuel nozzle provided on the side portion of the combustion liner of the gas turbine combustor.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
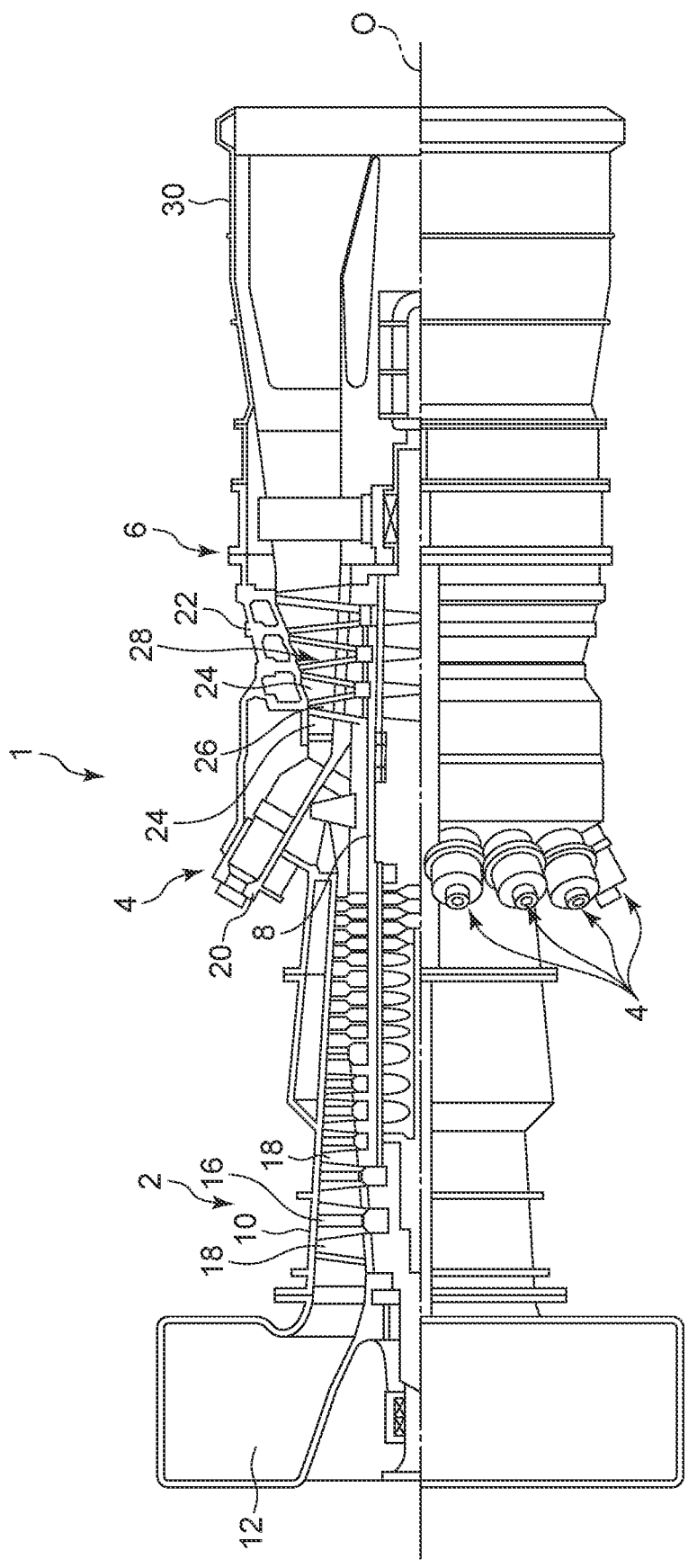
FIG. 1 is a schematic configuration diagram of a gas turbine according to an embodiment.

First, a gas turbine, which is an example of application of a fuel supply pipe assembly according to an embodiment, will be described with reference to FIG. 1. FIG. 1 is a schematic configuration diagram of a gas turbine according to an embodiment.

As shown in FIG. 1, the gas turbine 1 includes a compressor 2 for producing compressed air, a gas turbine combustor (combustor) 4 for producing combustion gas from the compressed air and fuel, and a turbine 6 configured to be rotationally driven by the combustion gas. In the case of the gas turbine 1 for power generation, a generator (not shown) is connected to the turbine 6.

The compressor 2 includes a plurality of stator vanes 16 fixed to a compressor casing 10 and a plurality of rotor blades 18 implanted on a rotor 8 alternately with the stator vanes 16.

Intake air from an air inlet 12 is sent to the compressor 2. The air passes through the plurality of stator vanes 16 and the plurality of rotor blades 18 and is compressed into compressed air having high temperature and high pressure.

The combustor 4 is supplied with fuel and compressed air produced in the compressor 2. The combustor 4 combusts the fuel to produce combustion gas that serves as a working fluid of the turbine 6. As shown in FIG. 1, the gas turbine 1 has a plurality of combustors 4 arranged along the circumferential direction around the rotor 8 inside a casing 20.

The turbine 6 has a combustion gas passage 28 turned by a turbine casing 22 and includes a plurality of stator vanes 24 and a plurality of rotor blades 26 disposed in the combustion gas passage 28. The stator vanes 24 and the rotor blades 26 of the turbine 6 are disposed downstream of the combustors 4 with respect to the combustion gas flow.

The stator vanes 24 are fixed to the turbine casing 22, and a set of the stator vanes 24 arranged along the circumferential direction of the rotor 8 forms a stator vane row. Further, the rotor blades 26 are mounted on the rotor 8, and a set of the rotor blades 26 arranged along the circumferential direction of the rotor 8 forms a rotor blade row. The stator vane rows and the rotor blade rows are alternately arranged in the axial direction of the rotor 8.

In the turbine 6, the combustion gas flowing into the combustion gas passage 28 from the combustors 4 passes through the plurality of stator vanes 24 and the plurality of rotor blades 26, thereby rotationally driving the rotor 8 about the axis O. Consequently, the generator connected to the rotor 8 is driven to generate power. The combustion gas having driven the turbine 6 is discharged to the outside via an exhaust chamber 30.

Next, the combustor 4 according to an embodiment will be described.

Figure 2:
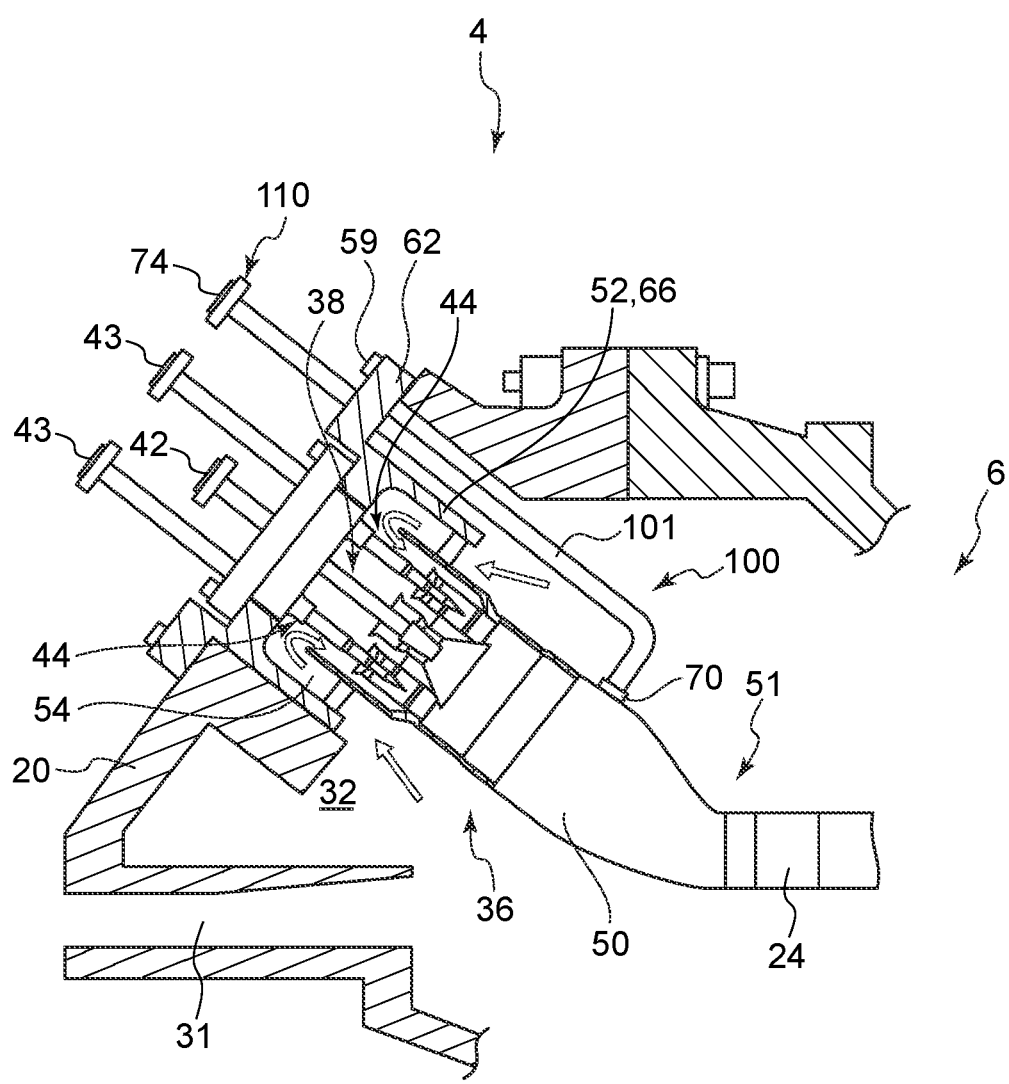
FIG. 2 is a schematic diagram of a combustor and an inlet portion of a turbine in the gas turbine according to an embodiment.

FIG. 2 is a schematic diagram of the combustor 4 and an inlet portion of the turbine 6 in the gas turbine 1 according to an embodiment.

Figure 3:
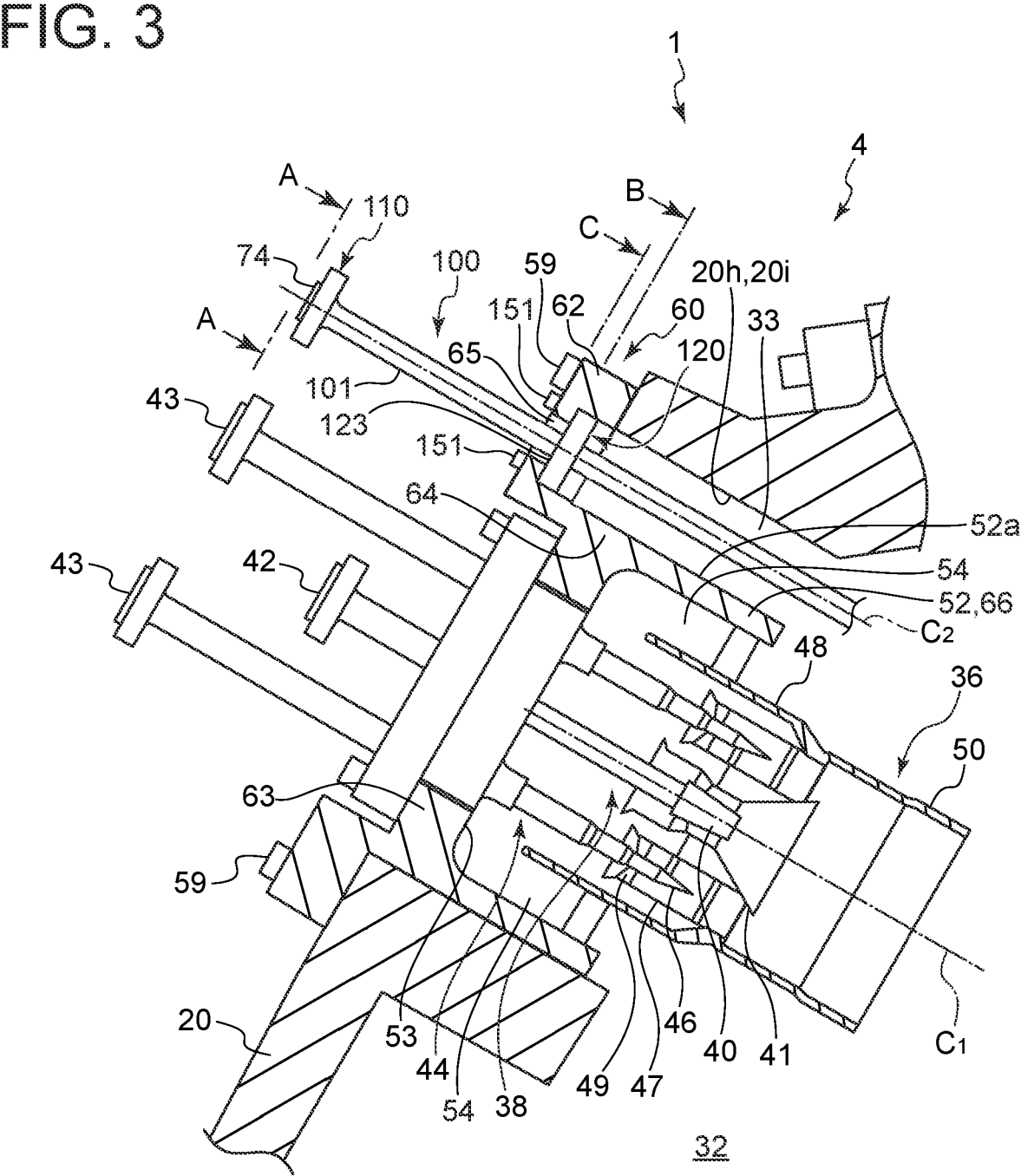
FIG. 3 is a schematic cross-sectional view of the combustor of the gas turbine according to an embodiment.

FIG. 3 is a schematic cross-sectional view of the combustor 4 of the gas turbine 1 according to an embodiment.

In the gas turbine 1 according to some embodiments, each of the plurality of combustors 4 arranged in the circumferential direction around the rotor 8 (see FIG. 1) includes a combustion tube (combustion liner), and a first combustion burner 38 and a plurality of second combustion burners 44 arranged in the combustion liner 36. The combustion liner 36 is disposed in a combustor casing space 32 defined by the casing 20, and the second combustion burners 44 are arranged so as to surround the first combustion burner 38. That is, the combustion liner 36, the first combustion burner 38, and the second combustion burners 44 are housed in the casing 20.

The combustion tube (combustion liner) 36 includes a combustor basket 48 surrounding the first combustion burner 38 and the plurality of second combustion burners 44, and a transition piece 50 connected to a tip portion of the combustor basket 48. The combustor basket 48 and the transition piece 50 may integrally be formed.

The first combustion burner 38 includes a first fuel nozzle 40 disposed along the direction of the central axis $C_1$ of the combustion liner 36 (i.e., axial direction of combustor 4) for injecting fuel, and a first burner cylinder 41 disposed so as to surround the first fuel nozzle 40. The first fuel nozzle 40 is supplied with fuel via a first fuel port 42.

Each second combustion burner 44 includes a second fuel nozzle 46 for injecting fuel and a second burner cylinder 47 disposed so as to surround the second fuel nozzle 46. The second fuel nozzle 46 is supplied with fuel via a second fuel port 43.

The combustor 4 further includes a combustor casing 52 disposed around the outer periphery of the combustor basket 48 inside the casing 20. An air passage 54 through which the compressed air flows is formed between the outer periphery of the combustor basket 48 and the inner periphery of the combustor casing 52.

The compressed air produced by the compressor 2 (see FIG. is supplied into the combustor casing space 32 via a casing inlet 31. The compressed air then flows from the combustor casing space 32 into the air passage 54 as combustion air, and is redirected at a wall surface portion 53 along the plane perpendicular to the axial direction of the combustor 4 to flow into the first burner cylinder 41 and the second burner cylinders 47. Then, the fuel injected from the fuel nozzle and the compressed air (combustion air) are mixed in each burner cylinder, and the air-fuel mixture flows into the combustion liner 36 to be ignited and combusted, thereby producing the combustion gas.

The first combustion burner 38 may be a burner for producing a diffusion combustion flame, and the second combustion burners 44 may be burners for combusting premixed air to produce a premixed combustion flame.

Specifically, the fuel from the second fuel port 43 and the compressed air are premixed in each second combustion burner 44, and the premixed air mainly forms a swirl flow by a swirler 49 and flows into the combustion liner 36. Further, the compressed air and the fuel injected from the first combustion burner 38 via the first fuel port 42 are mixed in the combustion liner 36, and the mixture is ignited by an ignition means (not shown) and combusted to produce the combustion gas. At this time, a part of the combustion gas diffuses to the surroundings with flames, which ignite the premixed air flowing into the combustion liner 36 from each second combustion burner 44 to cause combustion. That is, the diffusion combustion flame due to the fuel injected from the first combustion burner 38 can hold flames for stable combustion of the premixed air (premixed fuel) from the second combustion burners 44.

The combustion gas thus produced by combustion of the fuel in the combustor 4 flows into the turbine 6 via an outlet portion 51 of the combustor 4 disposed at the downstream end of the transition piece 50.

(Third Fuel Nozzle 70)

The combustor 4 includes a third fuel nozzle 70 disposed on a side portion of the combustion liner 36. That is, the third fuel nozzle 70 is a fuel nozzle for supplying fuel into the combustion liner 36 from the side of the combustion liner 36.

A plurality of third fuel nozzles 70 may be provided along the circumferential direction about the central axis $C_1$ of the combustion liner 36 (i.e., circumferential direction of combustor 4). The third fuel nozzle 70 is fixed to the transition piece 50, for example.

When fuel is infected from the third fuel nozzle 70 into the combustion liner 36, the combustion air in the combustion liner 36 and the injected fuel are mixed and combusted. By injecting fuel into the combustion liner 36 from the third fuel nozzle 70, fuel can be supplied to the secondary combustion zone in the transition section downstream of the primary combustion zone where the fuel from the first fuel nozzle 40 and the second fuel nozzles 46 is combusted. Thus, it is possible to improve the combustion efficiency while suppressing the generation of nitrogen oxides (NOx).

The combustor 4 may include other constituent elements such as a bypass line (not illustrated) for allowing the combustion gas to bypass.

The combustor 4 according to an embodiment includes a fuel supply pipe assembly 100 for supplying fuel to the third fuel nozzle 70, The fuel supply pipe assembly 100 according to an embodiment includes a fuel supply pipe 101 for supplying fuel to the third fuel nozzle 70, a first flange portion 110 capable of coupling with a flange portion of a fuel line (not shown) for supplying fuel to the fuel supply pipe 101, and a second flange portion 120 capable of coupling with a top hat portion 60 of the combustor 4, which will be described later.

In the fuel supply pipe assembly 100 according to an embodiment, fuel supplied from the fuel line (not shown) via the first flange portion 110, which is a third fuel port 74, flows in the fuel supply pipe 101 and is supplied to the third fuel nozzle 70.

In the combustor 4 according to an embodiment, one fuel supply pipe assembly 100 is provided for one combustor 4. If a plurality of third fuel nozzles 70 are provided along the circumferential direction of the combustor 4, fuel is distributed from one fuel supply pipe assembly 100 to the plurality of third fuel nozzles 70.

The fuel supply pipe assembly 100 according to an embodiment will be described in detail later.

(Top Hat Portion 60)

As shown in FIGS. 2 and 3, the combustor 4 according to an embodiment includes a flange portion 62 attached to the casing 20 and an annular extension portion 64 extending from the flange portion 62 along the axial direction of the combustor 4.

In the combustor 4 according to an embodiment, the part composed of the flange portion 62 and the extension portion 64 is also referred to as a top hat portion 60 because of its shape.

The top hat portion 60 according to an embodiment is a bottomed cylindrical member disposed to close a combustor insertion hole 20h formed in the casing 20.

As shown in FIGS. 2 and 3, the flange portion 62 has a shape that protrudes outward in the radial direction of the combustor 4 and is fixed to the casing 20 by bolts 59. The flange portion 62 is also referred to as a top hat body.

The extension portion 64 has a cylindrical shape that extends along the axial direction of the combustor 4 from the flange portion 62 toward the interior space of the casing 20. In an embodiment, the extension portion 64 is disposed radially inward of the casing 20.

As shown in FIGS. 2 and 3, the air passage 54 may be formed at least partially by the extension portion 64. In other words, the extension portion 64 may include an air passage forming portion 66 (combustor casing 52) that forms the air passage 54.

As shown in FIG. 3, in the gas turbine 1 according to an embodiment, in a region of the circumference of the combustor casing 52 on a relatively radially outer side with respect to the axis O of the rotor 8, an outer peripheral surface 52a of the combustor casing 52 is separated from an inner peripheral surface 20i of the combustor insertion hole 20h. Accordingly, in the gas turbine 1 according to an embodiment, a space 33 is formed between the outer peripheral surface 52a of the combustor casing 52 and the inner peripheral surface 20i of the combustor insertion hole 20h in the region on the relatively radially outer side with respect to the axis O of the rotor 8. The space 33 is a part of the combustor casing space 32 defined by the casing 20, and is filled with the compressed air produced by the compressor 2 (see FIG. 1) during operation of the gas turbine 1.

In the gas turbine 1 according to an embodiment, the fuel supply pipe 101 of the fuel supply pipe assembly 100 is disposed in the space 33. Further, the second flange portion 120 of the fuel supply pipe assembly 100 is attached to the flange portion 62 of the top hat portion 60 in the combustor casing space 32.

The flange portion 62 of the top hat portion 60 has a through hole 65 that penetrates the flange portion 62 along the central axis $C_1$ of the combustion liner 36. The fuel supply pipe 101 is inserted through the through hole 65.

In order to prevent the compressed air in the space 33 from leaking through the through hole 65 to the outside of the casing 20, the second flange portion 120 of the fuel supply pipe assembly 100 contacts the flange portion 62 of the top hat portion 60 from the inside of the casing 20, i.e., from the axially downstream side of the combustion liner 36 to close the through hole 65. The second flange portion 120 of the fuel supply pipe assembly 100 is secured to the flange portion 62 of the top hat portion 60 by bolts 151 at multiple circumferential positions about the central axis $C_2$ of the fuel supply pipe 101, as described below.

In the following description, with respect to the fuel supply pipe assembly 100, the axial direction of the fuel supply pipe 101, which is the extension direction of the central axis $C_2$ of the fuel supply pipe 101, is also simply referred to as the axial direction. Similarly, in the following description, with respect to the fuel supply pipe assembly 100, the circumferential direction of the fuel supply pipe 101, which is the circumferential direction about the central axis $C_2$, is also simply referred to as the circumferential direction, and the radial direction of the fuel supply pipe 101, which is the radial direction about the central axis $C_2$, is also simply referred to as the radial direction.

The central axis $C_2$ of the fuel supply pipe 101 is parallel to the central axis $C_1$ of the combustion liner 36 in at least a part of the region of the fuel supply pipe 101.

In the axial direction of the fuel supply pipe 101, the upstream side of the fuel flow through the fuel supply pipe 101 is the axially upstream side, and the downstream side of the fuel flow through the fuel supply pipe 101 is the axially downstream side.

Figure 4A:
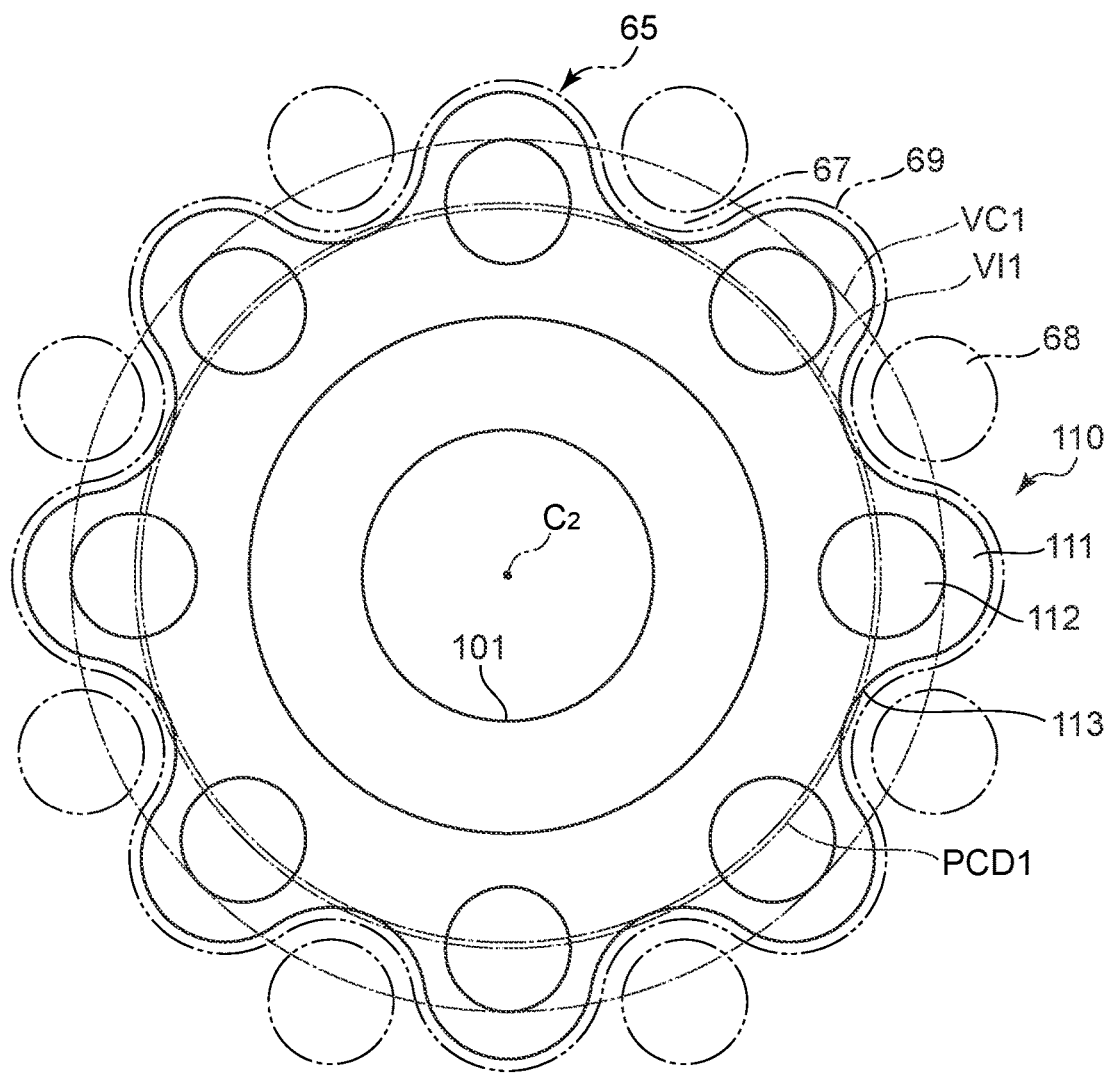
FIG. 4A is a diagram of a first flange portion of the fuel supply pipe assembly as viewed from the axially upstream side.

FIG. 4A is a diagram of the first flange portion 110 of the fuel supply pipe assembly 100 as viewed from the axially upstream side, and corresponds to view A-A of FIG. 3. In FIG. 4A, the through hole 65 in the flange portion 62 of the top hat portion 60 and third bolt holes 68 in the flange portion 62, which will be described later, as viewed from the axially upstream side are represented by dashed-two dotted lines.

Figure 4B:
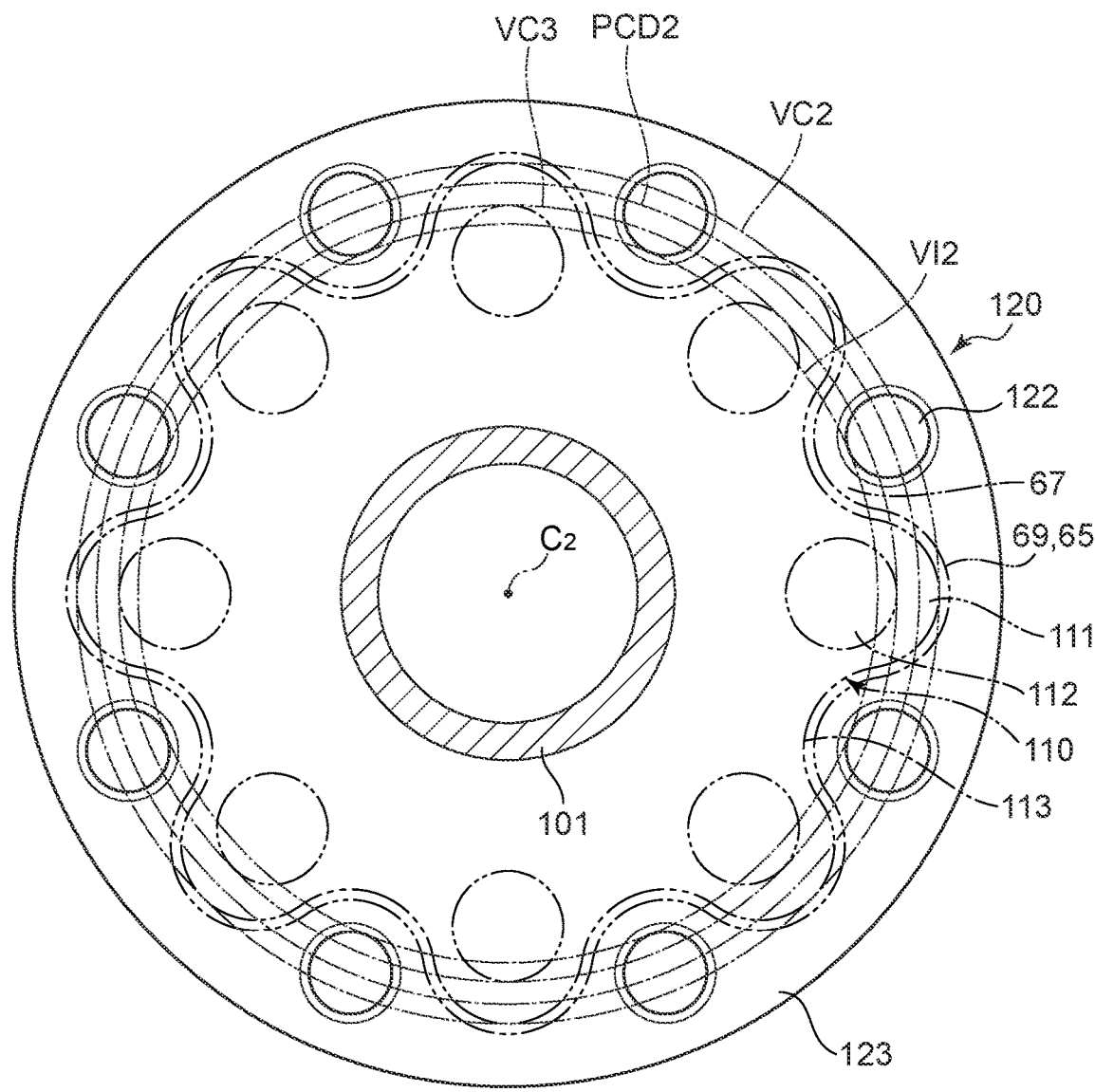
FIG. 4B is a diagram of a second flange portion of the fuel supply pipe assembly as viewed from the axially upstream side.

FIG. 4B is a diagram of the second flange portion 120 of the fuel supply pipe assembly 100 as viewed from the axially upstream side, and corresponds to view B of FIG. 3. In FIG. 4B, the shapes of the through hole 65 in the flange portion 62 of the top hat portion 60 as viewed from the axial direction and the first flange portion 110 as viewed from the axial direction are represented by dashed-two dotted lines.

Figure 4C:
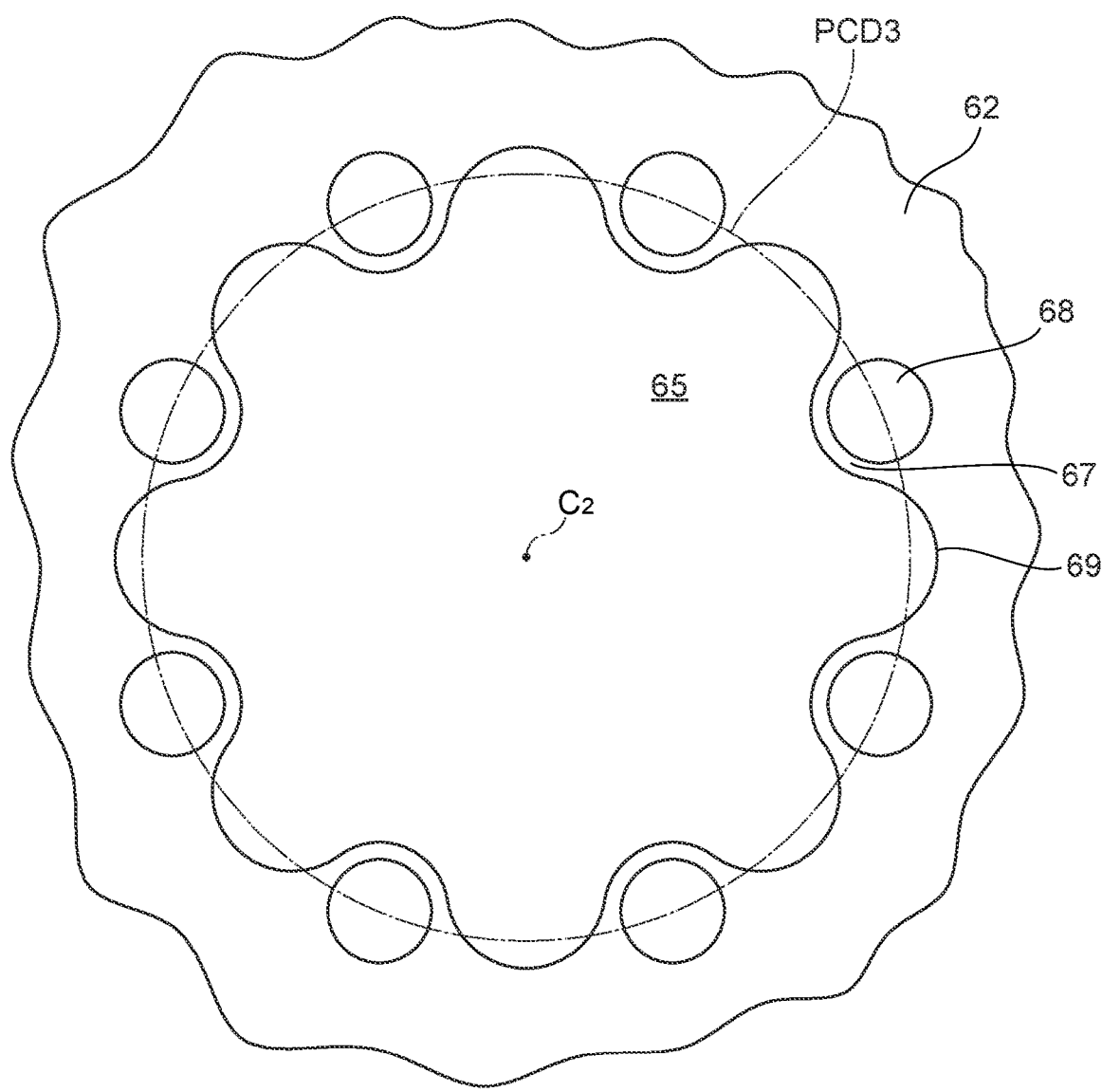
FIG. 4C is a diagram of a through hole in a flange portion of a top hat portion and third bolt holes in the flange portion as viewed from the axially upstream side.

FIG. 4C is a diagram of the through hole 65 in the flange portion 62 of the top hat portion 60 and the third bolt holes 68 in the flange portion 62 as viewed from the axially upstream side, and corresponds to view C of FIG. 3.

Figure 4D:
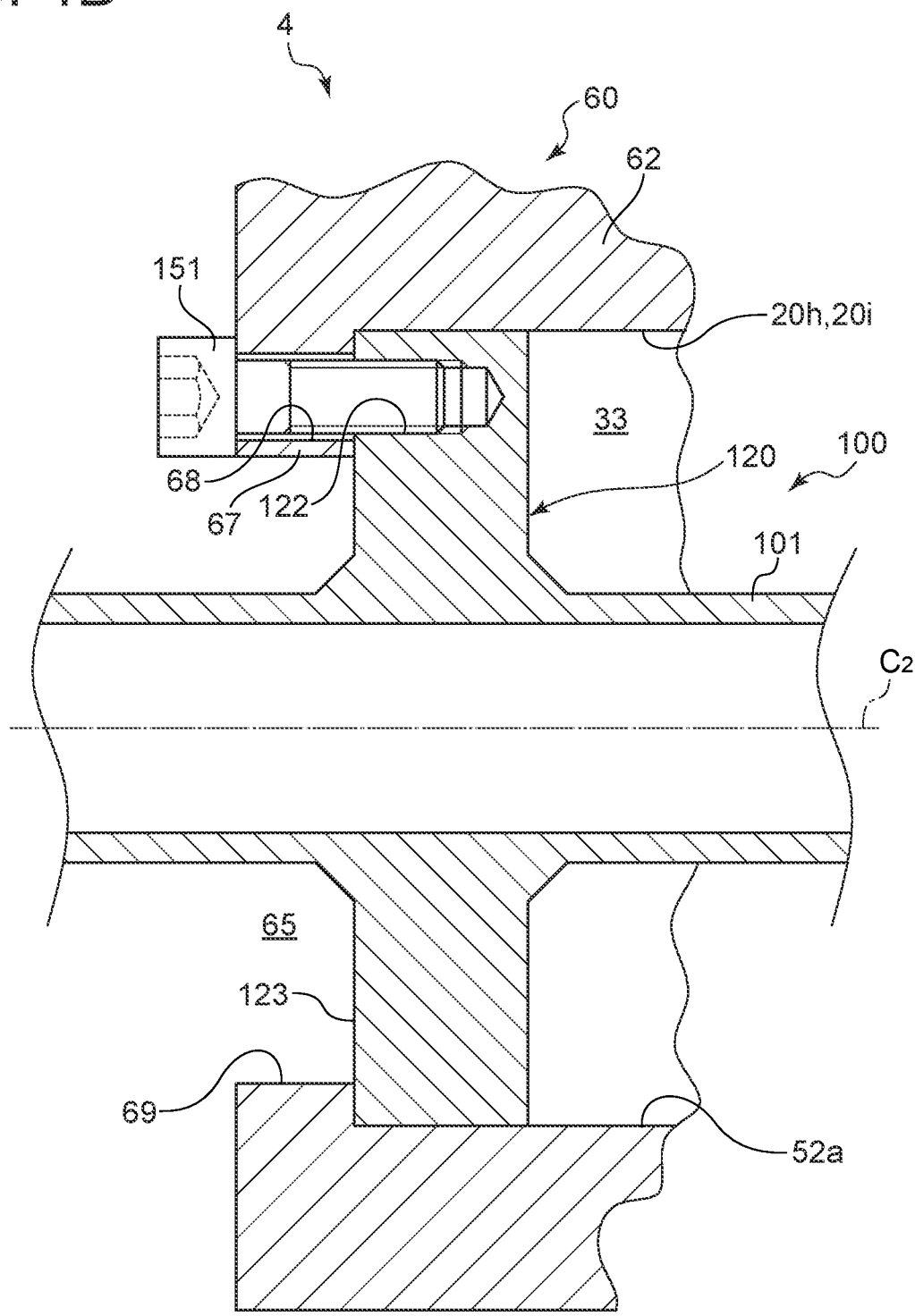
FIG. 4D is an enlarged view in the vicinity of the second flange portion of the fuel supply pipe assembly of FIG. 3.

FIG. 4D is an enlarged view in the vicinity of the second flange portion 120 of the fuel supply pipe assembly 100 of FIG. 3.

(Relation Between First Flange Portion 110 and Second Flange Portion 120 and Flange Portion 62)

In the fuel supply pipe assembly 100 according to an embodiment, when the top hat portion 60 of the combustor 4 is attached to the casing 20, it is necessary to pass the first flange portion 110 through the through hole 65 in the top hat portion 60. Therefore, the size of the through hole 65 in the top hat portion 60 must be large enough to allow the first flange portion 110 to be inserted.

From the viewpoint of the flow rate of fuel supplied to the third fuel nozzle 70, it is necessary to increase the diameter of the fuel supply pipe 101 to some extent, hut when the diameter of the fuel supply pipe 101 is increased, the diameter of the first flange portion 110 is also increased.

However, it is difficult to increase the size of the through hole 65 in the top hat portion 60 since it is restricted by the position of the casing 20 to which the top hat portion 60 is attached, the radial size of the space 33, or the like. Therefore, using a standardized flange as the first flange portion 110 makes it difficult to increase the diameter of the fuel supply pipe 101, making it difficult to ensure the flow rate of fuel supplied to the third fuel nozzle 70.

Moreover, as described above, the flange portion 62 of the top hat portion 60 and the second flange portion 120 of the fuel supply pipe assembly 100 are coupled by a plurality of bolts 151 in order to prevent leakage to the outside of the casing 20. However, it is difficult to increase the pitch circle diameter PCD3 of the plurality of bolt holes (third bolt holes 68) for attaching the bolts 151 since it is subject to the same restrictions as for the through hole 65.

In other words, in the combustor 4 according to an embodiment, it is desirable to increase the pitch circle diameter PCD1 of the bolt holes (first bolt holes) 112 of the first flange portion 110 to increase the diameter of the fuel supply pipe 101 to ensure a fuel flow rate required in the third fuel nozzle 70, but there are circumstances in which it is difficult to increase the diameter of the first flange portion 110 as described above.

Further, in the combustor 4 according to an embodiment, there are circumstances in which it is difficult to increase the pitch circle diameter PCD3 of the third bolt holes 68 for attaching the bolts 151 as described above.

To solve these problems, in the combustor 4 according to an embodiment, as shown in FIGS. 4A to 4C, the first flange portion 110 of the fuel supply pipe assembly 100 has a plurality of protrusions ill arranged at intervals in the circumferential direction and protruding radially outward.

The first flange portion 110 has a plurality of first bolt holes 112 arranged at intervals in the circumferential direction and penetrating the first flange portion 110 in the axial direction for coupling with the flange portion of the fuel line (not shown) for supplying fuel to the fuel supply pipe 101 by bolts (not shown). In the combustor 4 according to an embodiment, as shown in FIGS. 4A to 4C, the plurality of first bolt holes 112 are formed at the same circumferential positions as the protrusions 111, respectively.

As shown in FIG. 4A, the protrusions 111 protrude radially in the radial direction. Therefore, when viewed from the axial direction, the first flange portion 110 has a flower-like shape (a shape in which circumferentially arranged petals spread radially) with the protrusions 111 protruding radially outward.

Further, in the combustor 4 according to an embodiment, in order to reduce the size of the through hole 65 of the flange portion 62 of the top hat portion 60 to the extent that the first flange portion 110 of the fuel supply pipe assembly 100 can pass through, the through hole 65 is formed in a flower-like shape similar to the first flange portion 110 when viewed from the axial direction. More specifically, the flange portion 62 has a plurality of top hat protrusions 67 arranged at intervals in the circumferential direction and protruding radially inward toward the center of the through hole 65.

The flange portion 62 has a plurality of third bolt holes 68 arranged at intervals in the circumferential direction for attaching the bolts 151, In the combustor 4 according to an embodiment, as shown in FIGS. 4A and 4C, the plurality of third bolt holes 68 are formed at the same circumferential positions as the top hat protrusions 67, respectively.

The bolts 151 are inserted through the plurality of third bolt holes 68.

The first flange portion 110 of the fuel supply pipe assembly 100 has a plurality of recesses 113 each formed between two protrusions 111 adjacent in the circumferential direction, recessed radially inward, and arranged at intervals in the circumferential direction. In the first flange portion 110, the outer edge of the first flange portion 110 forming the recesses 113 the radial dimension of the first flange portion 110, and the circumferential arrangement of the recesses 113 are set so that when the first flange portion 110 passes through the through hole 65 of the flange portion 62 of the top hat portion 60, it passes radially inward of the top hat protrusions 67 of the flange portion 62 without interfering with the top hat protrusions 67. Specifically, the circumferential positions of the recesses 113 are set to be the same as the circumferential positions of the top hat protrusions 67 of the flange portion 62.

The flange portion 62 of the top hat portion 60 has a plurality of top hat recesses 69 each formed between two top hat protrusions 67 adjacent in the circumferential direction, recessed radially outward, and arranged at intervals in the circumferential direction. In the top hat portion 60, the outer edge of the through hole 65 forming the top hat recesses 69, the radial dimension of the through hole 65, and the circumferential arrangement of the top hat recesses 69 are set so that when the first flange portion 110 of the fuel supply pipe assembly 100 passes through the through hole 65, it does not interfere with the protrusions 111 of the first flange portion 110. Specifically, the circumferential positions of the top hat recesses 69 are set to be the same as the circumferential positions of the protrusions 111 of the first flange portion 110.

As shown in FIGS. 3 and 4D, the second flange portion 120 of the fuel supply pipe assembly 100 is disposed downstream of the first flange portion 110 in the axial direction so that the fuel supply pipe 101 extending in the axial direction passes therethrough. The second flange portion 120 has a plurality of second bolt holes 122 arranged at intervals in the circumferential direction and penetrating the second flange portion 120 in the axial direction.

The pitch circle diameter PCD2 of the plurality of second bolt holes 122 is equal to the pitch circle diameter PCD3 of the plurality of third bolt holes 68 of the flange portion 62 of the top hat portion 60. The circumferential positions of the plurality of second bolt holes 122 is the same as the circumferential positions of the third bolt holes 68. In other words, the center positions of the plurality of second bolt holes 122 and the center positions of the third bolt holes 68 are the same when viewed from the axial direction.

The second flange portion 120 is a disk-shaped plate flange and has an outer diameter larger than the bottom of the top hat recesses 69 of the flange portion 62 of the top hat portion 60, i.e., the portion of the through hole 65 with the largest diameter.

The plurality of second bolt holes 122 have female thread portions that can be screwed with male thread portions of the bolts 151.

As described above, the second flange portion 120 contacts the flange portion 62 of the top hat portion 60 from the axially downstream side to close the through hole 65. The second flange portion 121) is fixed to the flange portion 62 of the top hat portion 60 by the bolts 151.

Thus, in the fuel supply pipe assembly 100 according to an embodiment, the first flange portion 110 has the plurality of protrusions 111, and the first bolt holes 112 are formed at the same circumferential positions as the protrusions 111, so that the positions of the first bolt holes 112 can be set relatively radially outward while suppressing an increase in size of the first flange portion 110 other than the protrusions 111. This allows the diameter of the fuel supply pipe 101 to be large enough to ensure the flow rate of fuel supplied to the third fuel nozzle 70.

In the combustor 4 according to an embodiment, the flange portion 62 of the top hat portion 60 has the plurality of top hat protrusions 67, and the third bolt holes 68 are formed at the same circumferential positions as the top hat protrusions 67, so that the positions of the third bolt holes 68 can be set relatively radially inward. This makes it easier to provide the third bolt holes 68 even when the size of the through hole 65 in the flange portion 62 is restricted by the position of the casing 20 to which the top hat portion 60 is attached, the radial size of the space 33, or the like.

In the gas turbine 1 according to an embodiment, since the fuel supply pipe assembly 100 according to an embodiment is included, the diameter of the fuel supply pipe 101 can be large enough to ensure the flow rate of fuel supplied to the third fuel nozzle 70.

In the fuel supply pipe assembly 100 according to an embodiment, as shown in FIG. 4A, the size of a virtual circumscribed circle VC1 circumscribed to the plurality of first bolt holes 112 when viewed from the axial direction may be larger than the size of a virtual inscribed circle VI1 inscribed to the radially innermost positions of the plurality of recesses 113 when viewed from the axial direction.

Thereby, the positions of the first bolt holes 112 can be set relatively radially outward. Additionally, when the second bolt holes 122 of the second flange portion 120 are at the circumferential positions of the recesses 113 of the first flange portion 110, the pitch circle diameter PCD2 of the second bolt holes 122 can be made relatively small. As a result, even if the size of the top hat portion 60 cannot be increased much, the second flange portion 120 can be attached to the top hat portion 60.

In the fuel supply pipe assembly 100 according to an embodiment, as shown in FIG. 4A, the size of a virtual circle passing through the centers of the plurality of first bolt holes 112, i.e., the pitch circle diameter PCD1 of the first bolt holes 112 may be equal to or larger than the size of the virtual inscribed circle VI1.

Thereby, the positions of the first bolt holes 112 can be set further radially outward. Additionally, when the second bolt holes 122 of the second flange portion 120 are at the circumferential positions of the recesses 113 of the first flange portion 110, PCD2 of the second bolt holes 122 can be made smaller. As a result, even if the size of the top hat portion 60 cannot be increased much, the second flange portion 120 can be attached to the top hat portion 60.

In the fuel supply pipe assembly 100 according to an embodiment, as shown in FIGS. 4B and 4D, the second flange portion 120 may have the plurality of second bolt holes 122 penetrating the second flange portion 120 in the axial direction.

Thereby, the second flange portion 120 can be fixed to the top hat portion 60 of the combustor 4 by bolts 151 inserted through the plurality of second bolt holes 122.

In the fuel supply pipe assembly 100 according to an embodiment, as shown in FIG. 413, the size of the virtual inscribed circle VI2 inscribed to the plurality of second bolt holes 122 when viewed from the axial direction may be smaller than the size of a virtual circumscribed circle VC2 circumscribed to the protrusions 111 when viewed from the axial direction.

In FIG. 4B, the virtual inscribed circle VI2 is illustrated as an inscribed circle to the inner diameter of the female thread portion formed in each second bolt hole 122, but it may be an inscribed circle to the diameter of trough of the female thread portion or the effective diameter.

Thereby, it is possible to suppress an increase in diameter of the second flange portion 120.

In the fuel supply pipe assembly 100 according to an embodiment, as shown in FIG. 4B, the size of a virtual circle passing through the centers of the plurality of second bolt holes 122, i.e., the pitch circle diameter PCD2 of the second bolt holes 122 may be smaller than the size of the virtual circumscribed circle VC2 circumscribed to the protrusions 111 when viewed from the axial direction.

Thereby, it is possible to further suppress an increase in diameter of the second flange portion 120.

In the fuel supply pipe assembly 100 according to an embodiment, as shown in FIG. 4B, the size of the virtual inscribed circle VI2 inscribed to the plurality of second bolt holes 122 when viewed from the axial direction may be smaller than the size of a virtual circumscribed circle VC3 circumscribed to the plurality of first bolt holes when viewed from the axial direction.

Thereby, it is possible to suppress an increase in diameter of the second flange portion 120 while setting the positions of the first bolt holes 112 relatively radially outward.

In the combustor 4 according to an embodiment, as showy in FIGS. 3 and 4D, the second flange portion 120 may contact the flange portion 62 of the top hat portion 60 on an axially upstream side 123 of the fuel supply pipe 101, and may be fixed to the flange portion 62 by bolts 151 inserted in the second bolt holes 122 and the third bolt holes 68.

Thereby, the second flange portion 120 can be attached to the flange portion 62 even when the size of the through hole 65 in the flange portion 62 is restricted by the position of the casing to which the top hat portion 60 is attached, the radial size of the space 33, or the like. Additionally, with the above configuration, the through hole 65 in the flange portion 62 can be closed with the second flange portion 120. Thus, it is possible to prevent the compressed air in the combustor casing space 32 from leaking to the outside of the combustor casing space 32 through the through hole 65.

The present disclosure is not limited to the embodiments described above, but includes modifications to the embodiments described above, and embodiments composed of combinations of those embodiments.

The contents described in the above embodiments would be understood as follows, for instance.

(1) A fuel supply pipe assembly 100 according to at least one embodiment of the present disclosure is a fuel supply pipe assembly 100 for supplying fuel to a fuel nozzle (third fuel nozzle 70) provided on a side portion of a combustion liner 36 of a gas turbine combustor (combustor 5), provided with: a fuel supply pipe 101 for supplying the fuel to the fuel nozzle (third fuel nozzle 70); a first flange portion 110 capable of coupling with a flange portion of a fuel line for supplying the fuel to the fuel supply pipe 101; and a second flange portion 120 capable of coupling with a top hat portion 60 of the gas turbine combustor (combustor 4). The first flange portion 110 has a plurality of protrusions 111 arranged at intervals in the circumferential direction and protruding radially outward and a plurality of first bolt holes 112 penetrating the first flange portion 110 in the axial direction. The plurality of first bolt holes 112 are formed at the same circumferential positions as the protrusions 111, respectively.

With the above configuration (1), since the first bolt holes 112 are formed at the same circumferential positions as the protrusions 111, the positions of the first bolt holes 112 can be set relatively radially outward while suppressing an increase in size of the first flange portion 110 other than the protrusions 111. This allows the diameter of the fuel supply pipe 101 to be large enough to ensure the flow rate of fuel supplied to the fuel nozzle (third fuel nozzle 70).

(2) In some embodiments, in the above configuration (1), the first flange portion 110 may have a plurality of recesses 113 each formed between two protrusions 111 adjacent in the circumferential direction, recessed radially inward, and arranged at intervals in the circumferential direction. The size of a virtual circumscribed circle VC1 circumscribed to the plurality of first bolt holes 112 when viewed from the axial direction may be larger than the size of a virtual inscribed circle VI1 inscribed to the radially innermost positions of the plurality of recesses 113 when viewed from the axial direction.

With the above configuration (2), the positions of the first bolt holes 112 can be set relatively radially outward.

(3) In some embodiments, in the above configuration (2), the size (pitch circle diameter PCD1) of a virtual circle passing through the centers of the plurality of first bolt holes 112 may be equal to or larger than the size of the virtual inscribed circle VI1.

With the above configuration (3), the positions of the first bolt holes 112 can be set further radially outward.

(4) In some embodiments, in any one of the above configurations (1) to (3), the second flange portion 120 may have a plurality of second bolt holes 122 penetrating the second flange portion 120 in the axial direction.

With the above configuration (4), the second flange portion 120 can be fixed to the top hat portion 60 of the gas turbine combustor (combustor 4) by bolts 151 inserted through the plurality of second bolt holes 122.

(5) In some embodiments, in the above configuration (4), the size of a virtual inscribed circle VI2 inscribed to the plurality of second bolt holes 122 when viewed from the axial direction may be smaller than the size of a virtual circumscribed circle VC2 circumscribed to the protrusions 111 when viewed from the axial direction.

With the above configuration (5), it is possible to suppress an increase in diameter of the second flange portion 120.

(6) In some embodiments, in the above configuration (5), the size (pitch circle diameter PCD2) of a virtual circle passing through the centers of the plurality of second bolt holes 122 may be smaller than the size of the virtual circumscribed circle VC2 circumscribed to the protrusions 111 when viewed from the axial direction.

With the above configuration (6), it is possible to further suppress an increase in diameter of the second flange portion 120.

(7) In some embodiments, in any one of the above configurations (4) to (6), the size of a virtual inscribed circle VI2 inscribed to the plurality of second bolt holes 122 when viewed from the axial direction may be smaller than the size of a virtual circumscribed circle VC3 circumscribed to the plurality of first bolt holes 112 when viewed from the axial direction.

With the above configuration (7), it is possible to suppress an increase in diameter of the second flange portion 120 while setting the positions of the first bolt holes 112 relatively radially outward.

(8) A gas turbine combustor according to at least one embodiment of the present disclosure is provided with: the fuel supply pipe assembly 100 having any one of the above configurations (1) to (7); the combustion liner 36; the fuel nozzle (third fuel nozzle 70); and the top hat portion 60. The top hat portion 60 includes a top hat body (flange portion 62) having a through hole allowing the first flange portion 110 to pass through in the axial direction. The top hat body (flange portion 62) has a plurality of top hat protrusions 67 arranged at intervals in the circumferential direction and protruding radially inward toward the center of the through hole 65, and a plurality of third bolt holes 68 penetrating the top hat body (flange portion 62) in the axial direction. The plurality of third bolt holes 68 are formed at the same circumferential positions as the top hat protrusions 67, respectively.

With the above configuration (8), since the fuel supply pipe assembly 100 having any one of the above configurations (1) to (7) is included, the positions of the first bolt holes 112 can be set relatively radially outward while suppressing an increase in size of the first flange portion 110 other than the protrusions 111. This allows the diameter of the fuel supply pipe 101 to be large enough to ensure the flow rate of fuel supplied to the fuel nozzle (third fuel nozzle 70).

Additionally, with the above configuration (8), the positions of the third bolt holes 68 can be set relatively radially inward. This makes it easier to provide the third bolt holes 68 even when the size of the through hole 65 in the top hat body (flange portion 62) is restricted.

(9) In some embodiments, in the above configuration (8), the second flange portion 120 may have a plurality of second bolt holes 122 penetrating the second flange portion 120 in the axial direction. The second flange portion 120 may contact the top hat body (flange portion 62) on an upstream side 123 of the fuel supply pipe 101, and may be fixed to the top hat body (flange portion 62) by connection bolts (bolts 151) inserted in the second bolt holes 122 and the third bolt holes 68.

With the above configuration (9), the second flange portion 120 can be attached to the top hat body (flange portion 62) even when the size of the through hole 65 in the top hat body (flange portion 62) is restricted. Additionally, with the above configuration (9), the through hole 65 in the top hat body (flange portion 62) can be closed with the second flange portion 120. Thus, it is possible to prevent the compressed air in the combustor casing space 32 from leaking to the outside of the combustor casing space 32 through the through hole.

(10) A gas turbine 1 according to at least one embodiment of the present disclosure is provided with: a compressor 2; the gas turbine combustor (combustor 4) having the above configuration (8) or (9); and a turbine 6 configured to be driven by combustion gas from the gas turbine combustor (combustor 4).

The above configuration (10) allows the diameter of the fuel supply pipe 101 to be large enough to ensure the flow rate of fuel supplied to the fuel nozzle (third fuel nozzle 70).

The invention claimed is:

1. A gas turbine combustor, comprising:
    a combustion liner;
    a fuel nozzle provided on a side portion of the combustion liner;
    a fuel supply pipe assembly for supplying fuel to the fuel nozzle; and
    a top hat portion,
    wherein the fuel supply pipe assembly has:
        a fuel supply pipe for supplying the fuel to the fuel nozzle;
        a first flange portion capable of coupling with a flange portion of a fuel line for supplying the fuel to the fuel supply pipe; and
        a second flange portion capable of coupling with the top hat portion,
    wherein the first flange portion has a plurality of protrusions arranged at intervals in a circumferential direction and protruding radially outward, and a plurality of first bolt holes penetrating the first flange portion in an axial direction,
    wherein the plurality of first bolt holes are formed at same circumferential positions as the plurality of protrusions, respectively,
    wherein the top hat portion includes a top hat body having a through hole allowing the first flange portion to pass through in the axial direction,
    wherein the top hat body has a plurality of top hat protrusions arranged at intervals in the circumferential direction and protruding radially inward toward a center of the through hole, and a plurality of third bolt holes penetrating the top hat body in the axial direction, and
    wherein the plurality of third bolt holes are formed at same circumferential positions as the plurality of top hat protrusions, respectively.

2. The fuel supply pipe assembly according to claim 1,
    wherein the first flange portion has a plurality of recesses each formed between two protrusions adjacent in the circumferential direction, recessed radially inward, and arranged at intervals in the circumferential direction, and
    wherein a size of a virtual circumscribed circle circumscribed to the plurality of first bolt holes when viewed from the axial direction is larger than a size of a virtual inscribed circle inscribed to radially innermost positions of the plurality of recesses when viewed from the axial direction.

3. The fuel supply pipe assembly according to claim 2,
    wherein a size of a virtual circle passing through centers of the plurality of first bolt holes is equal to or larger than the size of the virtual inscribed circle.

4. The fuel supply pipe assembly according to claim 1,
    wherein the second flange portion has a plurality of second bolt holes penetrating the second flange portion in the axial direction.

5. The fuel supply pipe assembly according to claim 4,
    wherein a size of a virtual inscribed circle inscribed to the plurality of second bolt holes when viewed from the axial direction is smaller than a size of a virtual circumscribed circle circumscribed to the plurality of protrusions when viewed from the axial direction.

6. The fuel supply pipe assembly according to claim 5,
wherein a size of a virtual circle passing through centers of the plurality of second bolt holes is smaller than the size of the virtual circumscribed circle circumscribed to the plurality of protrusions when viewed from the axial direction.

7. The fuel supply pipe assembly according to claim 4,
    wherein a size of a virtual inscribed circle inscribed to the plurality of second bolt holes when viewed from the axial direction is smaller than a size of a virtual circumscribed circle circumscribed to the plurality of first bolt holes when viewed from the axial direction.

8. The gas turbine combustor according to claim 1,
    wherein the second flange portion has a plurality of second bolt holes penetrating the second flange portion in the axial direction, and
    wherein the second flange portion contacts the top hat body on an upstream side of the fuel supply pipe, and is fixed to the top hat body by connection bolts inserted in the second bolt holes and the third bolt holes.

9. A gas turbine, comprising:
    a compressor;
    the gas turbine combustor according to claim 1; and
    a turbine configured to be driven by combustion gas from the gas turbine combustor.

* * * * *